(12) United States Patent
Hill et al.

(10) Patent No.: US 10,526,983 B2
(45) Date of Patent: Jan. 7, 2020

(54) REDUCING UNBURNED HYDROCARBON EMISSIONS IN GASEOUS FUELED LEAN-BURN ENGINES

(71) Applicant: WESTPORT POWER INC., Vancouver (CA)

(72) Inventors: Philip G. Hill, Vancouver (CA); Bronson D. Patychuk, Oshawa (CA); Gordon P. McTaggart-Cowan, Vancouver (CA); Ning Wu, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 28 days.

(21) Appl. No.: 15/549,582

(22) PCT Filed: Feb. 10, 2016

(86) PCT No.: PCT/CA2016/050122
§ 371 (c)(1),
(2) Date: Aug. 8, 2017

(87) PCT Pub. No.: WO2016/127254
PCT Pub. Date: Aug. 18, 2016

(65) Prior Publication Data
US 2018/0094594 A1    Apr. 5, 2018

(30) Foreign Application Priority Data

Feb. 10, 2015   (CA) ..................................... 2881529

(51) Int. Cl.
*F02D 41/00*    (2006.01)
*F02M 21/02*    (2006.01)
(Continued)

(52) U.S. Cl.
CPC ...... *F02D 41/0027* (2013.01); *F02D 13/0211* (2013.01); *F02D 13/0265* (2013.01);
(Continued)

(58) Field of Classification Search
CPC ............... F02D 41/0027; F02D 19/024; F02D 13/0265; F02D 13/0269; F02D 15/00;
(Continued)

(56) References Cited

U.S. PATENT DOCUMENTS 5,307,783 A * 5/1994 Satoya .................. F02B 33/446
  123/559.3
6,363,313 B1 * 3/2002 Katoh ..................... F02D 41/02
  701/104

(Continued)

FOREIGN PATENT DOCUMENTS

JP    10-318005 A    12/1998
JP    2001-193468 A    7/2001

OTHER PUBLICATIONS

European Search Report, dated Sep. 4, 2018, for European Application No. 16748515.0-1007, 8 pages.
(Continued)

*Primary Examiner* — Jacob M Amick
*Assistant Examiner* — Charles Brauch
(74) *Attorney, Agent, or Firm* — Seed IP Law Group LLP (57) ABSTRACT

It is a challenge to reduce unburned hydrocarbon emissions for gaseous fuelled engines, especially at low engine load conditions, to meet demanding emission regulation targets. A method for reducing unburned hydrocarbon emissions in a lean-burn internal combustion engine that is fuelled with a gaseous fuel comprises adjusting the timing for closing of an intake valve as a function of engine operating conditions by one of advancing timing for closing of the intake valve and closing the intake valve earlier during an intake stroke;

(Continued)

and retarding timing for closing of the intake valve and closing the intake valve later during a compression stroke. The volumetric efficiency of the internal combustion engine is reduced and unburned hydrocarbon emissions are maintained below a predetermined level.

20 Claims, 5 Drawing Sheets

(51) Int. Cl.
  *F02D 13/02* (2006.01)
  *F02D 15/00* (2006.01)
  *F02D 19/02* (2006.01)

(52) U.S. Cl.
  CPC ......... *F02D 13/0269* (2013.01); *F02D 15/00* (2013.01); *F02D 19/024* (2013.01); *F02D 41/0007* (2013.01); *F02M 21/0215* (2013.01); *F02M 21/0275* (2013.01); *F02M 21/0284* (2013.01); *F02D 41/006* (2013.01); *F02D 2041/001* (2013.01); *Y02T 10/142* (2013.01); *Y02T 10/144* (2013.01); *Y02T 10/32* (2013.01)

(58) Field of Classification Search
  CPC ............. F02D 13/0211; F02D 41/0007; F02D 41/006; F02D 2041/001; F02M 21/0275; F02M 21/0284; F02M 21/0215; Y02T 10/142; Y02T 10/144; Y02T 10/32
  See application file for complete search history.

(56) References Cited

U.S. PATENT DOCUMENTS

| | | | |
|---|---|---|---|
| 7,156,072 B2 | 1/2007 | Song et al. | |
| 8,061,318 B2 | 11/2011 | Cleary et al. | |
| 8,375,904 B2 | 2/2013 | Gustafson | |
| 8,555,852 B2 | 10/2013 | Munshi et al. | |
| 2006/0016417 A1* | 1/2006 | Kuo | F01L 1/34 123/294 |
| 2006/0224282 A1 | 10/2006 | Seo et al. | |
| 2009/0107455 A1* | 4/2009 | Pallett | F02D 41/0007 123/299 |
| 2011/0155108 A1 | 6/2011 | Russ | |
| 2011/0219767 A1* | 9/2011 | Miyashita | F01L 1/185 60/600 |
| 2012/0160213 A1 | 6/2012 | Vijayaraghavan et al. | |
| 2012/0227397 A1 | 9/2012 | Willi et al. | |
| 2013/0340429 A1* | 12/2013 | Desai | F01N 5/02 60/608 |

OTHER PUBLICATIONS

Canadian Office Action, dated Apr. 28, 2015, for Canadian Application No. 2,881,529, 5 pages.
International Search Report and Written Opinion of the International Searching Authority, dated Apr. 27, 2016, for International Application No. PCT/CA2016/050122, 9 pages.
Chinese Office Action and Search Report for Chinese Patent Application No. 201680015264.1 dated Apr. 26, 2019, with partial English translation, (17 pages).

* cited by examiner

REDUCING UNBURNED HYDROCARBON EMISSIONS IN GASEOUS FUELED LEAN-BURN ENGINES

FIELD OF THE INVENTION

The present application relates to a technique for reducing unburned hydrocarbon emissions in lean-burn internal combustion engines that are fuelled with gaseous fuels.

BACKGROUND OF THE INVENTION

Lean-burn engines that are fuelled with a gaseous fuel suffer from unburned hydrocarbon emissions, especially at low engine loads when the equivalence ratio and cylinder temperature are too low to fully oxidize the fuel. Methane emissions are particularly problematic since methane (a greenhouse gas) cannot be oxidized in an oxidation catalyst at typical exhaust temperatures in lean-burn engines. Lean-burn engines are defined herein to be engines that operate with an equivalence ratio less than 1.0 for at least a majority of engine operating conditions and typically over the full range of engine operating conditions. Examples of lean-burn engines include high pressure direct injection (HPDI) engines that are mainly fuelled with natural gas and employ a pilot fuel, such as diesel, to ignite the main fuel, non-premixed engines that employ other ignition devices (such as a hot surface, a hot element, or a spark plug) and lean-burn fumigated engines that employ either a pilot fuel or an ignition device such as a spark plug as an ignition mechanism.

Lean-burn engines control engine load by varying fuelling quantity without necessarily changing the air system, and as a result the equivalence ratio (EQR) can vary over the range of engine operating conditions. This is unlike stoichiometric engines that maintain an equivalence ratio of one (1) over the majority of engine operating conditions. In a stoichiometric engine both the air system and the fuelling quantity are adjusted for each commanded engine load. For example, the air system can be adjusted by a throttle and as the mass air flow changes the fuelling quantity is simultaneously adjusted to achieve the desired load. Careful control is needed to ensure that the fuel-air equivalence ratio does not deviate from the stoichiometric ideal. For lean-burn engines the calibrated equivalence ratio at any one engine-load/engine-speed combination is a balance between competing demands, such as between combustion performance and emissions, maintaining smooth transitions during transient engine operating conditions ("map smoothness"), and avoiding compressor surge. This typically results in using low equivalence ratios (less than 0.4) at loads below 25% of full engine load, and under these circumstances methane emissions are relatively high.

Unburned hydrocarbon emissions can occur when gaseous fuel is over-mixed with air resulting in excessively low local equivalence ratios in certain regions of the combustion chamber. In these regions the gaseous fuel and air mixture is near or below the lower flammability limit and is too lean to burn. Other sources of unburned hydrocarbons include crevice and quench regions, where the flame cools too rapidly and is hence extinguished, or in rich areas of the reaction that never properly mix with an oxidizer, and hence are never fully burned. By increasing the temperature in the combustion chamber, the amount of fuel in the lean regions that can react increases; this leads to lower emissions of unburned gas. As a result, most previous techniques to control unburned emissions have focused on increasing in-cylinder temperatures. Techniques that lead to lower in-cylinder temperatures would generally be expected to make unburned hydrocarbon emissions worse for lean-burn engines.

Previous attempts at reducing unburned hydrocarbon emissions included combustion chamber mixing techniques that reduce the chance of forming regions where the local equivalence ratio was near or below the lower flammability limit. With manifold or port fuel injection the fuel will be largely premixed before combustion but the burning rate can be significantly enhanced by port and combustion chamber design to augment turbulence. With direct (late cycle) fuel injection the dominant turbulence source will be the jet injection momentum. Thus load (as well as injection timing) can significantly affect burning rate. In general with late injection it may be difficult to achieve satisfactory mixing and burning at low load even if the equivalence ratio is so low as to provide abundance of oxygen.

The state of the art is lacking in techniques for reducing unburned hydrocarbon emissions in lean-burn engines that are fuelled with a gaseous fuel. The present method and apparatus provide a technique for improving unburned hydrocarbon emissions in gaseous fuelled lean-burn internal combustion engines.

SUMMARY OF THE INVENTION

An improved method for reducing unburned hydrocarbon emissions in a lean-burn internal combustion engine that is fuelled with a gaseous fuel comprises adjusting the timing for closing of an intake valve as a function of engine operating conditions by one of advancing timing for closing of the intake valve and closing the intake valve earlier during an intake stroke; and retarding timing for closing of the intake valve and closing the intake valve later during a compression stroke. The volumetric efficiency of the internal combustion engine is reduced and unburned hydrocarbon emissions are maintained below a predetermined level. The engine operating conditions comprise engine load and RPM.

In an exemplary embodiment the timing for closing the intake valve is adjusted when engine load is less than 50% of full engine load conditions. The timing for closing the intake valve can be advanced between 20 and 90 crank angle degrees, and the timing for closing the intake valve can be retarded between 20 and 90 crank angle degrees. The gaseous fuel can be one of biogas, biofuel, hydrogen, butane, ethane, propane, methane, natural gas and a combination of these gaseous fuels. An equivalence ratio can be maintained between 0.4 and 0.95 over the range of engine operating conditions.

In another exemplary embodiment, boost pressure and/or turbo speed can be maintained higher when the engine load transitions from a higher load to a lower load condition compared to when the timing for closing the intake valve is not adjusted.

In yet another exemplary embodiment, the method can further comprise, as a function of engine operating conditions, advancing timing for closing of an exhaust valve during an exhaust stroke thereby trapping exhaust gases in a combustion chamber of the internal combustion engine; and retarding timing for opening the intake valve during the intake stroke. The timing for closing the exhaust valve can be advanced up to 40 crank angle degrees, and the timing for opening the intake valve can be retarded up to 40 crank angle degrees. Preferably, the intake valve is opened when combustion chamber pressure is near to, equal or less than intake manifold pressure.

An improved apparatus for reducing unburned hydrocarbon emissions in a lean-burn internal combustion engine that is fuelled with a gaseous fuel comprises a combustion chamber and an intake port in fluid communication with the combustion chamber. There is an intake valve selectively allowing fluid communication between the intake port and the combustion chamber. A first variable valve actuation system is operatively connected with the intake valve. An electronic controller is operatively connected with the first variable valve actuation system and programmed to adjust timing for closing of the intake valve as a function of engine operating conditions by one of advancing timing for closing of the intake valve and closing the intake valve earlier during an intake stroke; and retarding timing for closing of the intake valve and closing the intake valve later during a compression stroke. Volumetric efficiency of the internal combustion engine is reduced and unburned hydrocarbon emissions are maintained below a predetermined level. The gaseous fuel can be introduced directly into the combustion chamber with a direct fuel injector, and/or can be introduced up stream of the intake valve with a port injector or other conventional device for introducing gaseous fuel.

In an exemplary embodiment, the apparatus further comprises an exhaust port in fluid communication with the combustion chamber and an exhaust valve selectively allowing fluid communication between the combustion chamber and the exhaust port. There is also a second variable valve actuation system operatively connected with the exhaust valve. The electronic controller is further programmed to advance timing for closing the exhaust valve during an exhaust stroke thereby trapping exhaust gases in the combustion chamber; and retard timing for opening the intake valve during the intake stroke.

DETAILED DESCRIPTION OF PREFERRED EMBODIMENT(S)

Figure 1:
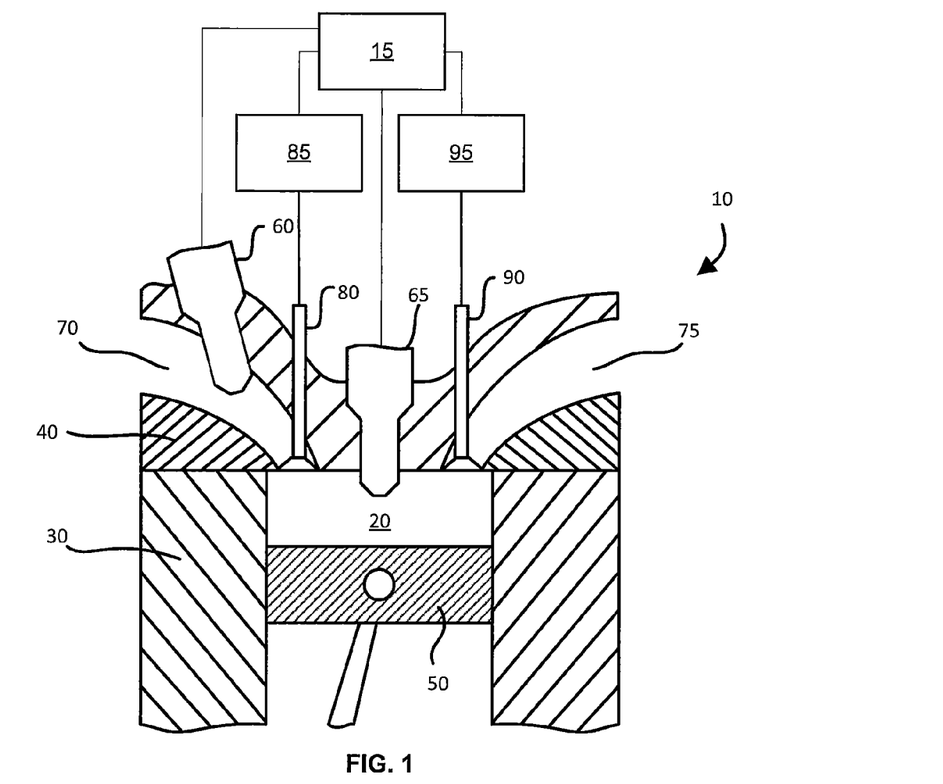
FIG. 1 is a partial schematic view of an internal combustion engine comprising a direct fuel injector and/or a port fuel injector for introducing a gaseous fuel into a combustion chamber of the engine according to one embodiment of a technique for reducing unburned hydrocarbon emissions in a lean-burn engine.

FIG. 1 illustrates an engine apparatus that can be operated according to an embodiment of the disclosed technique to reduce unburned hydrocarbon emissions as taught herein. Engine 10 comprises combustion chamber 20, which in this example is defined by cylinder block 30, cylinder head 40 and piston 50. Only one such cylinder is shown in FIG. 1 although as would be known by those skilled in the technology engine 10 normally comprises two or more cylinders, and the technique disclosed herein applies to any lean-burn engine having one or more cylinders. Port fuel injector 60 introduces gaseous fuel to intake port 70 upstream of intake valve 80 such that a charge comprising air and gaseous fuel is drawn into combustion chamber 20 when the intake valve is open. Direct fuel injector 65 directly introduces gaseous fuel into combustion chamber 20. For convenience in describing the techniques taught herein both injectors 60 and 65 are illustrated in FIG. 1 to indicate that fuel can either be directly injected or introduced upstream of intake valve 80. In other embodiments either port injector 60 or direct injector 65 can be employed. Intake valve 80 is opened and closed by variable valve actuation (VVA) system 85 to communicate an intake charge from intake port 70 into combustion chamber 20. Exhaust valve 90 is opened and closed by VVA system 95 to evacuate exhaust gases from combustion chamber 20 through exhaust port 75. VVA systems 85 and 95 can change the timing for opening and/or closing and/or the amount of lift for valves 80 and 90 respectively. The amount of lift is measured with respect to the closed positions for valves 80 and 90 where these valves are blocking fluid communication with combustion chamber 20 from intake and exhaust ports 70 and 75 respectively. Electronic controller 15 is operatively connected with injectors 60 and 65 to command injection of gaseous fuel, and with variable valve actuation systems 85 and 95 to command the opening and closing of valves 80 and 90 respectively. Engine 10 further comprises an ignition source (not shown) that ignites the gaseous fuel. The ignition source can be the combustion of a pilot fuel, a hot surface or hot element, or ignition devices such as a spark plug or laser igniter.

In the embodiments herein electronic controller 15 comprises a processor and memories, including one or more permanent memories, such as FLASH, EEPROM and a hard disk, and a temporary memory, such as SRAM and DRAM, for storing and executing a program. In other embodiments, electronic controller 15 can comprise an application specific integrated circuit (ASIC), an electronic circuit, a processor (shared, dedicated, or group) and memory that execute one or more software or firmware programs, a combinational logic circuit, and/or other suitable components that provide the functionality described herein.

Figure 2:
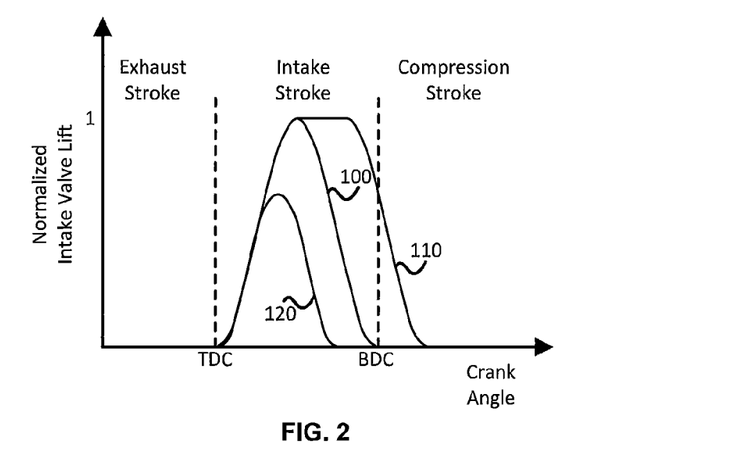
FIG. 2 is a chart that plots intake valve lift from a closed position on the vertical axis versus measured crank angle degrees on the horizontal axis for an intake valve of the internal combustion engine of FIG. 1. Lift profiles illustrating early intake valve closing (EIVC) and late intake valve closing (LIVC) are presented relative to a reference profile.

Excessive intake charge mass was identified as a primary cause for low global equivalence ratio resulting in local over leaning of gaseous fuel and increased unburned hydrocarbon emissions. A study was performed to test the effects of varying equivalence ratio on unburned hydrocarbon emissions by adjusting intake valve timing. Both late intake valve closing (LIVC) and early intake valve closing (EIVC) were considered. LIVC and EIVC adjust the effective compression ratio and volumetric efficiency of engine 10 by changing the intake valve closure timing. LIVC holds intake valve 80 open beyond the bottom dead center (BDC) position and closes the intake valve during the compression stroke at a timing that is retarded compared to the timing for conventional intake valve closing whereby the effective compression ratio is decreased. EIVC closes intake valve 80 during the intake stroke before the BDC position at a timing that is advanced compared to the timing for conventional intake valve closing whereby the effective compression ratio is decreased. LIVC and EIVC are illustrated in FIG. 2 with respect to reference intake valve lift profile 100 (herein also referred to as the reference profile) where intake valve 80 is closed in and around BDC between the intake and compression strokes. Intake valve lift profile 110 illustrates LIVC and intake valve lift profile 120 illustrates EIVC. Although intake valve lift profile 120 is illustrated to have a reduced amount of lift compared to lift profiles 100 and 110, this is not a requirement and in other embodiments all lift profiles 100, 110 and 120 can have the same maximum lift amount, or not. Both LIVC and EIVC restrict the amount of air that enters the engine as combustion chamber 20 is not at or near maximum volume at the time of intake valve closure.

Figure 3:
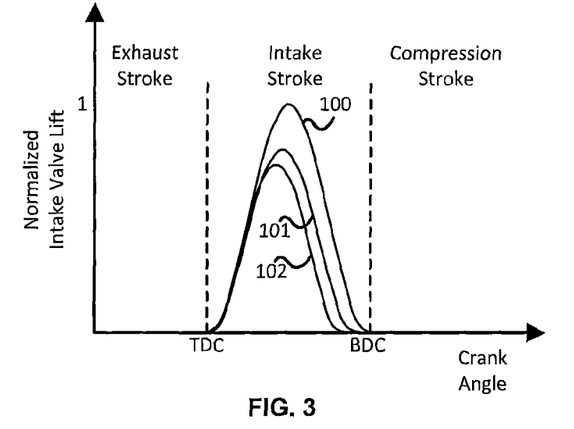
FIG. 3 is a chart that plots intake valve lift from the closed position on the vertical axis versus measured crank angle degrees on the horizontal axis for the reference lift profile of FIG. 2, and two early intake valve closing lift profiles where the intake valve closes 20 CA° and 40 CA° respectively before the reference lift profile during the intake stroke.
Figure 4:
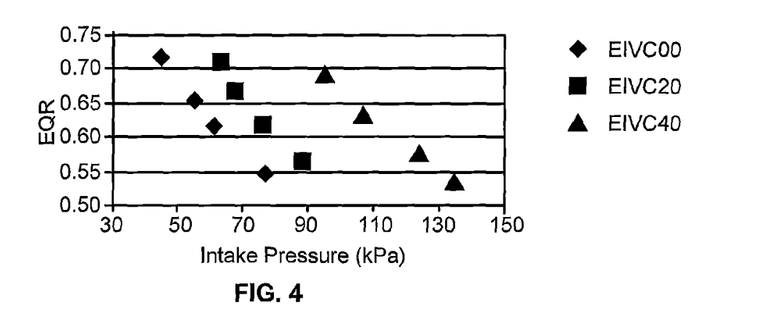
FIG. 4 is a chart that plots equivalence ratio on the vertical axis versus intake manifold pressure on the horizontal axis for the reference lift profile and the early intake valve closing lift profiles of FIG. 3.
Figure 5:
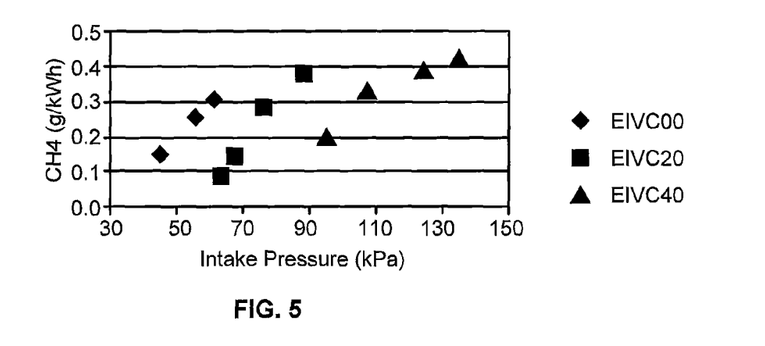
FIG. 5 is a chart that plots unburned methane (CH4) emissions on the vertical axis versus intake manifold pressure on the horizontal axis for the reference lift profile and the early intake valve closing lift profiles of FIG. 3.
Figure 6:
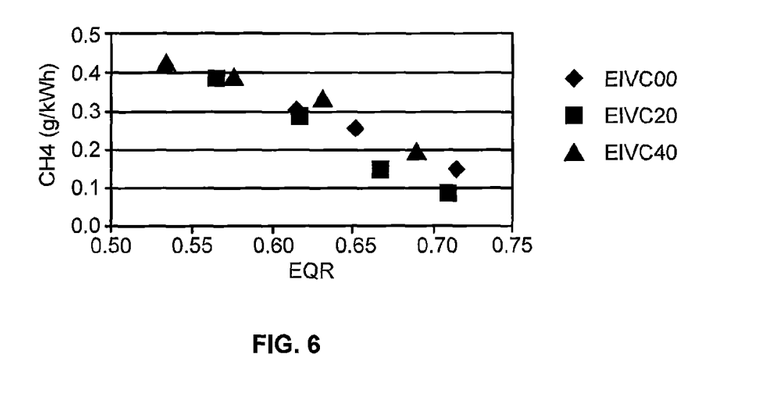
FIG. 6 is a chart that plots the unburned methane emissions on the vertical axis versus the equivalence ratio on the horizontal axis for the reference lift profile and the early intake valve closing lift profiles of FIG. 3.

In the study, variable valve actuation system 85 was configured to close intake valve 80 before BDC by a variety of crank angle degree (CA°) amounts. Referring to FIG. 3, intake valve lift profiles 101 and 102 illustrate the cases when VVA system 85 closed the intake valve twenty (20) and forty (40) CA° respectively before the timing at which the intake valve was closed during reference profile 100. The equivalence ratio and the unburned hydrocarbon emissions were tabulated against the intake pressure in intake port 70 and these tabulated results are graphically illustrated in FIGS. 4 and 5 respectively. In these figures EIVC00, EIVC20 and EIVC 40 represent the tabulated results for profiles 100, 101 and 102 respectively. With reference to FIG. 4, it can be seen that for a fixed intake pressure a higher equivalence ratio (that is, a richer mixture of gaseous fuel and air) can be obtained by advancing intake valve closure compared to the reference profile, and the earlier intake valve 80 is closed the higher the equivalence ratio. With reference to FIG. 5, it can be seen that for a fixed intake pressure lower unburned hydrocarbon emissions (less methane in the exhaust) can also be obtained by advancing intake valve closure compared to the reference profile, and the earlier intake valve 80 is closed the greater the reduction in methane emissions. The gaseous fuel employed during the study was natural gas, which is a mixture of a variety of gaseous fuels of which the primary constituent is methane. The unburned hydrocarbon emissions measured during the study is referred to as unburned methane emissions ($CH_4$ is the chemical abbreviation for methane). As an example of the reduction in emissions, there is over a 70% drop in methane emissions with the EVIC40 profile compared to the reference profile. FIG. 6 plots unburned methane emissions ($CH_4$) versus equivalence ratio and illustrates that there is a strong relationship between methane emissions and equivalence ratio. It is known that unburned hydrocarbon emissions can be reduced by maintaining the equivalence ratio within a predetermined range (that is, the gaseous fuel and air mixture is prevented from over leaning) when using the reference profile. However, it was previously thought that the decreased combustion chamber temperature at the end of compression resulting from the use of either LIVC or EIVC valve timing would counteract the unburned hydrocarbon benefits of maintaining the EQR within the predetermined range. This lower end-of-compression temperature is a direct result of the compression stroke effectively starting at a smaller volume than for conventional valve timing. How much smaller that volume is depends on the intake valve timing, and results in an effective compression ratio defined as the volume in chamber 20 when intake valve 80 closes (with exhaust valve 90 already closed) divided by the minimum volume in chamber 20 at the end of the compression stroke. Surprisingly, what the experimental data shows is that the lower volumetric efficiency and effective compression ratio do not appear to be fundamentally changing the combustion behavior in terms of methane oxidation.

Figure 7:
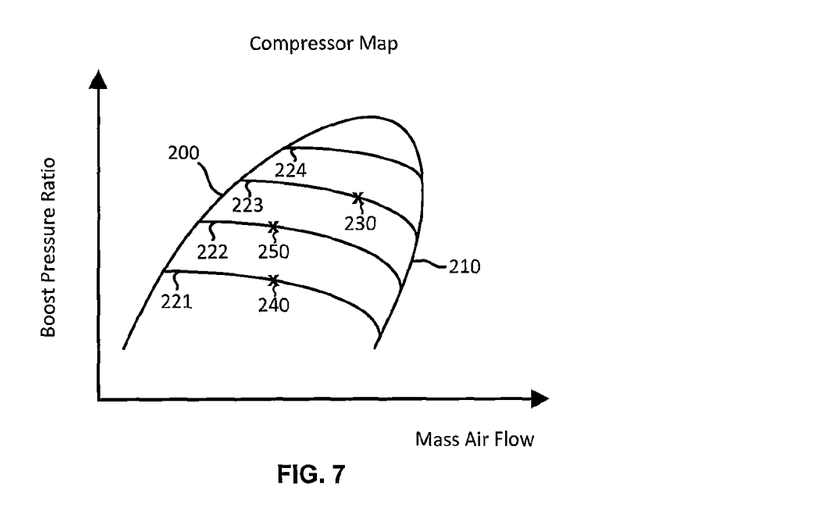
FIG. 7 is a chart known as a compressor map that plots boost pressure ratio on the vertical axis versus mass air flow through the compressor on the horizontal axis.

Transient engine performance can be improved and unburned hydrocarbon emissions can be reduced in other embodiments when engine 10 comprises a turbocharger. Normally, as engine load is decreased in turbocharged engines not using variable valve actuation the equivalence ratio can only be maintained within a predetermined range by reducing the boost pressure (that is intake manifold pressure), such that the mass of air ingested by combustion chamber 20 is also reduced. For the same intake valve timing and boost pressure, the equivalence ratio decreases as fuelling quantity is decreased resulting in increased unburned hydrocarbon emissions. As was revealed in the study disclosed herein, a desired equivalence ratio can be maintained while keeping boost pressure constant by closing intake valve 80 in advance of or retarded to reference profile 100. Effectively, as shown in FIG. 4, the equivalence ratio can be kept higher for a given intake pressure through use of EIVC timing. In this manner, the turbocharger can be kept "spun-up" such that turbo-lag is reduced (improved transient response) when the load on engine 10 is increased. FIG. 7 shows a compressor map for a compressor (not shown) of a turbocharger system. The normal operating region for the compressor is within the boundary defined by surge contour line 200 and choke contour line 210. Within this boundary the compressor operates along a plurality of compressor speed lines of which four such compressor speed lines 221, 222, 223 and 224 are illustrated in FIG. 7. Compressor speed increases from speed line 221 to speed line 224. Operating point 230 along speed line 223 is an exemplary operating point of the compressor during a high load condition. When engine 10 transitions to a lower load condition in the absence of variable valve actuation, the compressor transitions to operating point 240 along speed line 221 such that the mass flow of air into combustion chamber 20 is reduced to maintain the equivalence ratio within the predetermined margin. When variable valve actuation is available and the intake valve can be closed early (EIVC) or late (LIVC), the compressor can instead transition between operating point 230 and 250 such that the mass flow of air into combustion chamber 20 is the same but the compressor is now operating at a high speed and boost pressure along speed line 222. When engine 10 transitions back to operating 230, there is less turbo-lag (better transient response) when transitioning from operating point 250 compared to operating point 240.

Figure 8:
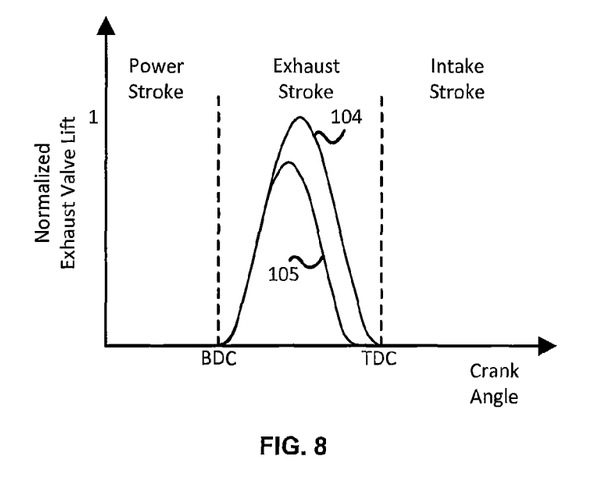
FIG. 8 is a chart that plots exhaust valve lift from a closed position on the vertical axis versus measured crank angle degrees on the horizontal axis for an exhaust valve of the internal combustion engine of FIG. 1. A lift profile illustrating early exhaust valve closing (EEVC) is presented relative to a reference profile.
Figure 9:
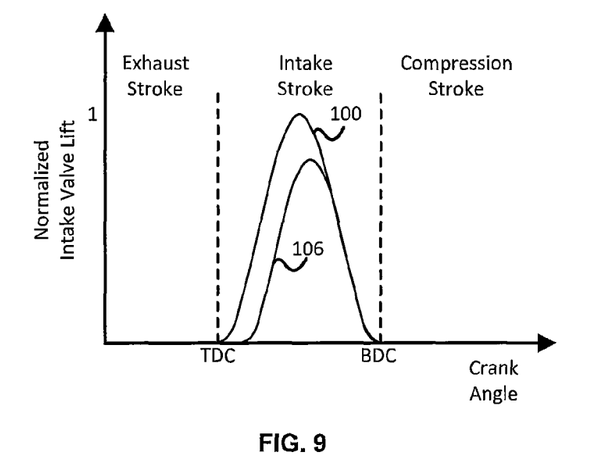
FIG. 9 is a chart that plots intake valve lift from a closed position on the vertical axis versus measured crank angle degrees on the horizontal axis for an intake valve of the internal combustion engine of FIG. 1. A life profile illustrating late intake valve opening (LIVO) is presented relative to a reference profile.
Figure 10:
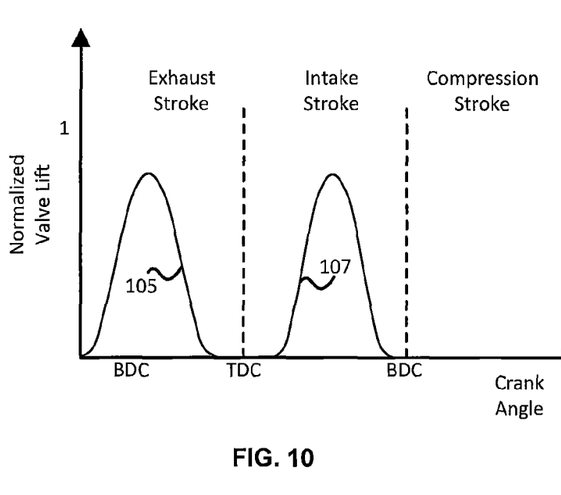
FIG. 10 is a chart that plots valve lift from closed positions on the vertical axis versus measured crank angle degrees on the horizontal axis for an exhaust valve and an intake valve of the internal combustion engine of FIG. 1. An exhaust life profile illustrating early exhaust valve closing (EIVC) and an intake lift profile illustrating late intake valve opening (LIVO) and early intake valve closing (EIVC) are presented.

Low load engine performance can be improved and unburned hydrocarbon emissions can simultaneously be reduced by trapping a fraction of exhaust gases within combustion chamber 20 at the end of the exhaust stroke in combination with the EIVC or LIVC technique to reduce unburned hydrocarbon emissions. Exhaust gases can be trapped in combustion chamber 20 by advancing the closing of exhaust valve 90 before all the exhaust gases have been evacuated from the combustion chamber. This is known as early exhaust valve closing (EEVC). FIG. 8 illustrates exhaust valve reference lift profile 104 and early exhaust valve closing lift profile 105 where the timing of the closing of exhaust valve 90 has been advanced compared to the reference lift profile. When the exhaust valve is closed early during the exhaust stroke, the piston continues to travel towards top dead center (TDC) thereby compressing the exhaust gases. To prevent the pressurized exhaust gases from blowing back into intake port 70, intake valve 80 is opened later in the intake stroke when the pressure in combustion chamber 20 is near to or below the pressure in the intake port. This is known as late intake valve opening (LIVO). FIG. 9 illustrates intake valve reference lift profile 100 and late intake valve opening lift profile 106 where the timing of the opening of intake valve 80 has been retarded compared to the reference lift profile. FIG. 10 illustrates early exhaust valve closing lift profile 105 and intake valve lift profile 107 where the timing of the opening of the intake valve is retarded and the timing of the closing of the intake valve has been advanced compared to reference lift profile 100 illustrated in FIG. 9. By trapping hot exhaust gases in combustion chamber 20 the temperature of the combustion chamber increases during the subsequent intake and compression strokes compared to when no exhaust gases are trapped. The increased temperature improves ignition performance during low load conditions. By employing early or late intake valve closing the equivalence ratio can be increased and unburned hydrocarbon emissions can be reduced.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method for reducing unburned hydrocarbon emissions in a lean-burn internal combustion engine that is fueled with a gaseous fuel, the lean-burn internal combustion engine having a combustion chamber including an intake valve, the method comprising:
    adjusting the timing for closing of the intake valve as a function of engine operating conditions such that (1) a fuel/air equivalence ratio in the combustion chamber is below 1.0 over a full range of engine operating conditions, and (2) when an engine load is below 50% of a maximum load the fuel/air equivalence ratio in the combustion chamber is maintained, between 0.5 and 0.75 by adjusting the timing for closing the intake valve by at least one of:
        advancing timing for closing of the intake valve and closing the intake valve earlier during an intake stroke compared to when the intake valve closes during the intake stroke when the engine load is above 50% of the maximum load; and
        retarding timing for closing of the intake valve and closing the intake valve later during a compression stroke compared to when the intake valve closes during the compression stroke when the engine load is above 50% of the maximum load;
    wherein the volumetric efficiency of the internal combustion engine is reduced and unburned hydrocarbon emissions are maintained below a predetermined level.

2. The method of claim 1, wherein the engine operating conditions comprise engine load.

3. The method of claim 2, further comprising at least one of:
    advancing the timing for closing the intake valve between 20 and 90 crank angle degrees; and
    retarding the timing for closing the intake valve between 20 and 90 crank angle degrees.

4. The method of claim 2, further comprising maintaining a higher boost pressure when the engine load transitions from a higher load to a lower load condition compared to when the timing for closing the intake valve is not adjusted.

5. The method of claim 2, further comprising maintaining a higher turbo speed when the engine load transitions from a higher load to a lower load condition compared to when the timing for closing the intake valve is not adjusted.

6. The method of claim 1, wherein as a function of engine operating conditions, the method further comprises:
    advancing timing for closing of an exhaust valve during an exhaust stroke thereby trapping exhaust gases in a combustion chamber of the internal combustion engine; and
    retarding timing for opening the intake valve during the intake stroke.

7. The method of claim 1, further comprising at least one of:
    advancing the timing for closing the exhaust valve up to 40 crank angle degrees;
    retarding the timing for opening the intake valve up to 40 crank angle degrees; and
    opening the intake valve when combustion chamber pressure is equal to or less than intake manifold pressure.

8. The method of claim 1, wherein the gaseous fuel is one of biogas, biofuel, hydrogen, butane, ethane, propane, methane, natural gas and a combination of these gaseous fuels.

9. The method of claim 1, wherein an equivalence ratio is maintained between 0.4 and 0.95 over the range of engine operating conditions.

10. An apparatus for reducing unburned hydrocarbon emissions in a lean-burn internal combustion engine that is fueled with a gaseous fuel comprising:
    a combustion chamber;
    an intake port in fluid communication with the combustion chamber;
    an intake valve selectively allowing fluid communication between the intake port and the combustion chamber;
    a first variable valve actuation system operatively connected with the intake valve; and
    an electronic controller operatively connected with the first variable valve actuation system to control the first variable valve actuation system and programmed to cause the first variable valve actuation system to adjust timing for closing of the intake valve as a function of engine operating conditions such that (1) a fuel/air equivalence ratio in the combustion chamber is below 1.0 over a full range of engine operating conditions, and (2) when an engine load is below 50% of a maximum load the fuel/air equivalence ratio in the combustion chamber is maintained between 0.5 and 0.75 by adjusting the timing for closing the intake valve by at least one of:

advancing timing for closing of the intake valve and closing the intake valve earlier during an intake stroke compared to when the intake valve closes during the intake stroke when the engine load is above 50% of the maximum load; and     retarding timing for closing of the intake valve and closing the intake valve later during a compression stroke compared to when the intake valve closes during the compression stroke when the engine load is above 50% of the maximum load;

wherein the volumetric efficiency of the internal combustion engine is reduced and unburned hydrocarbon emissions are maintained below a predetermined level.

11. The apparatus of claim 10, wherein the engine operating conditions comprise engine load.

12. The apparatus of claim 11, wherein the electronic controller is further programmed to at least one of:

advance the timing for closing the intake valve between 20 and 90 crank angle degrees; and     retard the timing for closing the intake valve between 20 and 90 crank angle degrees.

13. The apparatus of claim 11, wherein the electronic controller is further programmed to maintain a higher boost pressure when the engine load transitions from a higher load to a lower load condition compared to when the timing for closing the intake valve is not adjusted.

14. The apparatus of claim 11, wherein the electronic controller is further programmed to maintain a higher turbo speed when the engine load transitions from a higher load to a lower load condition compared to when the timing for closing the intake valve is not adjusted.

15. The apparatus of claim 10, further comprising:

an exhaust port in fluid communication with the combustion chamber;

an exhaust valve selectively allowing fluid communication between the combustion chamber and the exhaust port; and     a second variable valve actuation system operatively connected with the exhaust valve;

wherein the electronic controller is further programmed to:

advance timing for closing the exhaust valve during an exhaust stroke thereby trapping exhaust gases in the combustion chamber; and     retard timing for opening the intake valve during the intake stroke.

16. The apparatus of claim 10, wherein the electronic controller is further programmed to at least one of:

advance the timing for closing the exhaust valve up to 40 crank angle degrees;

retard the timing for opening the intake valve is retarded up to 40 crank angle degrees; and     open the intake valve when combustion chamber pressure is equal to or less than intake manifold pressure.

17. The apparatus of claim 10, wherein the gaseous fuel is one of biogas, biofuel, hydrogen, butane, ethane, propane, methane, natural gas and a combination of these gaseous fuels.

18. The apparatus of claim 10, wherein an equivalence ratio is maintained between 0.4 and 1.0 over the range of engine operating conditions.

19. The apparatus of claim 10, further comprising a first fuel injector for directly introducing gaseous fuel into the combustion chamber.

20. The apparatus of claim 19, further comprising a second fuel injector for directly introducing gaseous fuel into the intake port.

* * * * *

UNITED STATES PATENT AND TRADEMARK OFFICE
CERTIFICATE OF CORRECTION

PATENT NO. : 10,526,983 B2  
APPLICATION NO. : 15/549582  
DATED : January 7, 2020  
INVENTOR(S) : Philip G. Hill Page 1 of 1

It is certified that error appears in the above-identified patent and that said Letters Patent is hereby corrected as shown below:

In the Claims

Claim 10, Column 8, Line 53:
"emissions in a lean-bum internal combustion engine that is" should read, --emissions in a lean-burn internal combustion engine that is--.

Signed and Sealed this
Twenty-fifth Day of February, 2020

Andrei Iancu
*Director of the United States Patent and Trademark Office*